United States Patent
Zhang et al.

(10) Patent No.: US 12,353,835 B2
(45) Date of Patent: Jul. 8, 2025

(54) MODEL TRAINING METHOD AND METHOD FOR HUMAN-MACHINE INTERACTION

(71) Applicant: BEIJING BAIDU NETCOM SCIENCE TECHNOLOGY CO., LTD., Beijing (CN)

(72) Inventors: Hongyang Zhang, Beijing (CN); Zhenyu Jiao, Beijing (CN); Shuqi Sun, Beijing (CN); Yue Chang, Beijing (CN); Tingting Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 368 days.

(21) Appl. No.: 18/061,029

(22) Filed: Dec. 2, 2022

(65) Prior Publication Data
US 2023/0094730 A1    Mar. 30, 2023

(30) Foreign Application Priority Data
Jan. 26, 2022    (CN) .......................... 202210113215.9

(51) Int. Cl.
*G06F 40/35*    (2020.01)
*G06F 40/186*    (2020.01)
*G06F 40/279*    (2020.01)

(52) U.S. Cl.
CPC ............ *G06F 40/35* (2020.01); *G06F 40/186* (2020.01); *G06F 40/279* (2020.01)

(58) Field of Classification Search
CPC ....... G06F 40/35; G06F 40/279; G06F 40/186
See application file for complete search history.

(56) References Cited

U.S. PATENT DOCUMENTS

| | | | |
|---|---|---|---|
| 2009/0293045 A1 | 11/2009 | Cheriton | |
| 2021/0248471 A1* | 8/2021 | Jiao | ........................ G06N 3/084 |
| 2022/0019736 A1 | 1/2022 | Ouyang et al. | |
| 2022/0027768 A1* | 1/2022 | Rosu | ....................... G06F 40/44 |
| 2023/0297784 A1* | 9/2023 | Lopez Garcia | ....... G06Q 10/067 |
| 2023/0409615 A1* | 12/2023 | Khemka | ................ G06V 20/68 |

FOREIGN PATENT DOCUMENTS

| | | |
|---|---|---|
| CN | 108305634 A | 7/2018 |
| CN | 109597993 A | 4/2019 |
| CN | 109766355 A | 5/2019 |

(Continued)

OTHER PUBLICATIONS

Office Action issued for corresponding Chinese patent application 202210113215.9, mailed Sep. 21, 2022 (19 pages).

(Continued)

*Primary Examiner* — Mohammad K Islam
(74) *Attorney, Agent, or Firm* — Osha Bergman Watanabe & Burton LLP (57) ABSTRACT

A model training method, a method and an apparatus for human-machine interaction. The method includes: acquiring a sample set corresponding to a template; constructing positive example pairs and negative example pairs for a contrastive learning task based on the sample set; performing contrastive learning training on a pre-training model based on the positive example pairs and the negative example pairs for the contrastive learning task.

16 Claims, 3 Drawing Sheets

(56) References Cited

FOREIGN PATENT DOCUMENTS

| | | | | |
|---|---|---|---|---|
| CN | 110795945 A | * | 2/2020 | ............. G06F 16/35 |
| CN | 111831813 A | * | 10/2020 | ......... G06F 16/3329 |
| CN | 112733550 A | | 4/2021 | |
| CN | 113282736 A | | 8/2021 | |
| CN | 113408299 A | | 9/2021 | |
| CN | 113792818 A | | 12/2021 | |
| CN | 113806646 A | * | 12/2021 | ............. G06F 40/30 |
| JP | 5166661 B2 | * | 3/2013 | ......... G06F 17/2247 |
| WO | WO-2021245493 A1 | * | 12/2021 | ............. G06F 40/30 |

OTHER PUBLICATIONS

Notice of Allowance issued for corresponding Chinese patent application 202210113215.9, mailed Nov. 9, 2022 (10 pages).

* cited by examiner

MODEL TRAINING METHOD AND METHOD FOR HUMAN-MACHINE INTERACTION

CROSS-REFERENCE TO RELATED APPLICATIONS

This application claims the benefit of priority to Chinese Application No. 202210113215.9, filed on Jan. 26, 2022, the contents of which are incorporated herein by reference in their entirety.

TECHNICAL FIELD

The present application discloses a model training method and a method and an apparatus for human-machine interaction, and relates to the field of artificial intelligence, and specifically relates to fields of natural language processing, intelligent search, deep learning, and the like.

BACKGROUND

In the process of human-machine dialogue interaction, the machine needs to understand the semantics of dialogue sentences. The pre-training model based on large-scale of unsupervised data has made breakthrough improvements in many natural language processing tasks. When the pre-training model is applied to a specific field, knowledge in the field will usually be integrated into the pre-training model, so that a general pre-training model can play a better effect in the specific field.

Compared with an annotated sample, a template can be regarded as an expression of a class of sentences, or can be regarded as a collection of many sentences having the same semantics, and the template contains richer semantic information. Introducing template knowledge into the pre-training model will make the semantic representation produced by the pre-training model more suitable for dialogue understanding.

SUMMARY

The present application provides a model training method and a method for human-machine interaction, a device as well as a storage medium.

According to a first aspect of the present application, a model training method is provided, which includes:
acquiring a sample set corresponding to a template;
constructing positive example pairs and negative example pairs for a contrastive learning task based on the sample set;
performing contrastive learning training on a pre-training model based on the positive example pairs and the negative example pairs for the contrastive learning task.

According to a second aspect of the present application, a method for human-machine interaction is provided, which includes:
acquiring user input content;
inputting the user input content into a pre-trained pre-training model to obtain intention and word slots of the user input content; wherein the pre-trained pre-training model is trained and obtained by using the model training method according to the first aspect;
acquiring system feedback according to the intentions and the word slots.

According to a third aspect of the present application, an electronic device is provided, which includes:
at least one processor; and
a memory communicatively connected to the at least one processor; wherein
instructions executable by the at least one processor are stored in the memory, and the instructions are executed by the at least one processor, so that the at least one processor can execute the method according to the first aspect, or so that the at least one processor can execute the method according to the second aspect.

According to a fourth aspect of the present application, a non-transitory computer-readable storage medium storing computer instructions is provided, the computer instructions are configured to cause the computer to execute the method according to the first aspect, or to enable at least one processor to execute the method according to the second aspect.

It should be understood that what is described in the present section is not intended to identify key or important features of embodiments of the present application, nor is it intended to limit the scope of the present application. Other features of the present application will be readily understood through the following description.

BRIEF DESCRIPTION OF THE DRAWINGS

The accompanying drawings are used to better understand the present solution, and do not constitute a limitation to the present application, in which.

DETAILED DESCRIPTION

Exemplary embodiments of the present application will be described below in conjunction with the accompanying drawings, which include various details of the embodiments of the present application to facilitate understanding, and they should be regarded as exemplary only. Accordingly, those of ordinary skill in the art will recognize that various changes and modifications of the embodiments described herein can be made without departing from the scope and spirit of the present application. Also, descriptions of well-known functions and constructions are omitted in the following description for clarity and conciseness.

SimCLR (A Simple Framework for Contrastive Learning of Visual Representations): A simple adversarial learning framework for generating visual representations.

BERT (Bidirectional Encoder Representation from Transformers), a bidirectional deep language model based on Transformer, which is a pre-training model.

XLNet is a generalized autoregressive language model, which is constructed based on Transformer-XL.

ERNIE (Enhanced Representation through Knowledge Integration), a knowledge-enhanced semantic representation model.

In the process of human-machine dialogue interaction, the machine needs to understand the semantics of dialogue sentences. At present, the structural representation method of intention and slot is usually used to represent semantic information of user dialogue. Compared with the dialogue understanding model of a deep neural network, the method based on template matching has the advantages of strong interpretability, easy intervention, and high accuracy, and is usually applied to the cold start phase of dialogue systems.

In recent years, pre-training models based on large-scale of unsupervised data, such as BERT, XLNet, ERNIE1.0, ERNIE2.0 and the like, have made breakthrough improvements in many NLP (Natural Language Processing) tasks. They use tasks such as language models and the like to perform self-supervised learning. The model will automatically learn various semantic knowledge in the data, and given a sentence, the pre-training model can give a semantic representation in a better way. When the pre-training model is applied to a specific field, knowledge on the field will usually be integrated into the pre-training model, so that a general pre-training model can play a better effect in the specific field.

After analysis, there are usually two methods to combine a template as a feature into the model, one is to combine the template as an input into the model, and the other is to independently encode the template into a vector and combine it with the output vector of the model.

The above-mentioned first combination method uses the template as a feature to be input into the model, and does not let the model itself learn the knowledge in the template, which has two disadvantages. The first disadvantage is that: it is not universal. For some scene, if the user does not configure the template, the pre-training model has no features and cannot use the knowledge of the template. The second disadvantage is that the original structure of the pre-training model is destroyed, the features and the semantic knowledge of the model itself are not fully combined, and the effect is often not ideal.

A large number of user annotation templates has been accumulated in the current dialogue platform, and contain richer semantic information. Introducing the knowledge of the template into the pre-training model will make the semantic representation produced by the pre-training model more suitable for dialogue understanding tasks.

In order to solve the above technical problems, the present application proposes a model training method, apparatus, an electronic device and a computer-readable storage medium, which can realize that the template knowledge is learned into the model itself, and on the basis of maintaining the structure of the model, the template knowledge is fully combined with the semantic knowledge of the pre-training model, and which have universality and ease of use.

The model training method, apparatus, the electronic device and the computer-readable storage medium proposed according to the embodiments of the present application will be described below with reference to the accompanying drawings.

Figure 1:
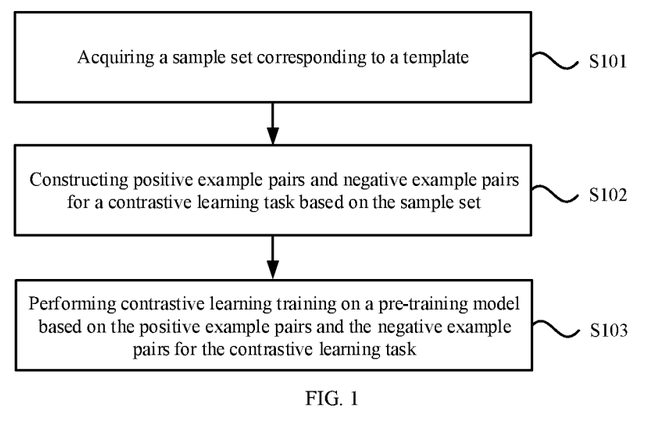
FIG. 1 is a schematic diagram of a model training method according to a first embodiment of the present application.

FIG. 1 is a flowchart of a model training method according to one embodiment of the present application. It should be noted that the model training method of the embodiment of the present application can be applied to the model training apparatus of the embodiment of the present application. The model training apparatus can be configured on the electronic device. As shown in FIG. 1, the model training method may include the following steps.

At Step S101, a sample set corresponding to a template is acquired.

It can be understood that a template can be regarded as a collection of many samples having the same semantics and sentence pattern, and the semantics contained by the template can be represented with samples by constructing a candidate set containing a large number of samples for each template.

As a possible implementation, the method for constructing a candidate set containing a large number of samples for each template is, to mine a large number of samples matching the template from the user's logs to be used as the sample set of the template.

When the number of samples matched from the user's logs is relatively small, a generative method can also be applied to generate a large number of samples for each template to constitute or supplement the sample set of the template.

In the embodiment of the present application, templates include two types: ordered templates and unordered templates.

An ordered template contains only one template fragment, which will be matched sequentially. As an example, an ordered template is: [kw_from] [user_from_poi] [kw_to] [user_to_poi], and the template contains 4 keywords, in which the vocabulary values of kw_from are "from", "I am in" and the like, and the vocabulary values of user_from_poi are location-related words, such as "museum", "science and technology museum" and the like, the vocabulary values of kw_to are "go", "to" and the like, and the vocabulary values of user_to_poi are also location-related words. The ordered template above can match "From the Museum to the People's Park", "I am in the Science and Technology Museum and will go to the Water Park".

An unordered template is a template group that contains a plurality of template fragments. The entire template has three attributes: template fragment order, whether the template fragment is necessary, and threshold of coverage rate. Wherein if the attribute value of the template fragment order is equal to 0, it represents that there is no order requirement for the template fragments when matching, and if the order is greater than 0, it needs to be sorted according to values of the sizes. As an example: the template fragment kw_list has no order requirement, and the template fragments user_time and user_remind_type need to appear before kw_remind. The premise of matching a template is that the template fragments each with the value of the attribute "whether the template fragment is necessary" indicating "must match" must be matched, otherwise the template cannot be matched.

In the following example: the attribute value "whether the template fragment is necessary" of the template fragments kw_list and kw_remind is "must match". After satisfying the template fragment order and "must match", the coverage rate of the template also needs to be checked. The coverage rate=the length of the matched template fragment/the total sentence length. The unordered template is considered as truly matched only when the coverage rate exceeds the threshold.

| Template Fragment | Order | Whether necessary | Example for Vocabulary Value |
|---|---|---|---|
| kw_list | 0 | 1 | Check |
| kw_want | 0 | 0 | I want to |
| user_time | 1 | 0 | Today |
| user_remind_type | 1 | 0 | To the company |
| kw_remind | 2 | 1 | Schedule |
| Template Threshold | | | 0.6 |

It should be noted that each template fragment in an unordered template can include one or more keywords, and only an example, in which each template fragment contains one keyword, was given above. It is also possible to regard each template fragment in an unordered template as one ordered template.

At step S102, positive example pairs and negative example pairs for a contrastive learning task are constructed based on the sample set.

It is understandable that humans often learn to distinguish things through comparison, such as 10 yuan and 50 yuan. Most people cannot draw all the details on the two banknotes without facsimileing, but can easily distinguish them. In the same way, a model does not need to learn excessively specific details of each object, but only needs to learn main features enough to distinguish multiple objects. This is the motivation for contrastive learning to be proposed.

Contrastive learning is an unsupervised representation learning method. Contrastive learning tasks will be constructed by defining the types of positive and negative examples to be compared, and the model will be used for comparative learning to draw similar samples for positive examples closer and push away dissimilar samples for negative examples, so that the model learns a better semantic representation that is more suitable for the task.

Therefore, the contrastive learning tasks required for model training need to be constructed. That is, positive example pairs and negative example pairs for contrastive learning need to be constructed.

It should be noted that, for a model, contrastive learning tasks from different perspectives can be constructed, such as contrastive tasks between templates of different scene, contrastive tasks between templates of different intents, and so on.

At step S103, contrastive learning training is performed on a pre-training model based on the positive example pairs and the negative example pairs for the contrastive learning task.

After acquiring the positive example pairs and the negative example pairs for the contrastive learning, the pre-training model can be trained using the contrastive learning method. The pre-training model is caused to judge similarities and differences of the samples generated by the template, thereby introducing template knowledge into the pre-training model.

The model training method of the embodiment of the present application first acquires a sample set that contains template semantics, and then constructs positive example pairs and negative example pairs for the contrastive learning task from the sample set, and trains the pre-training model by comparison of the positive example pairs and the negative example pairs, and causes the pre-training model to judge similarities and differences of the samples generated by the template, thereby introducing template knowledge into the pre-training model, and making the semantic representation produced by the pre-training model more suitable for dialogue understanding tasks.

Figure 2:
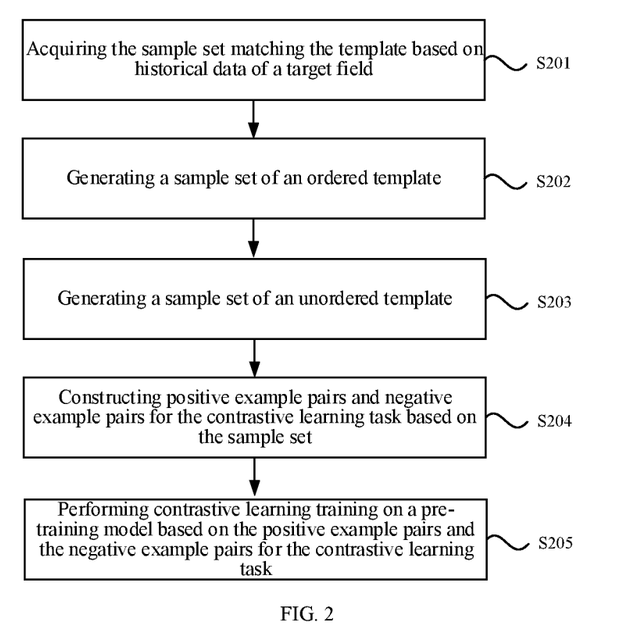
FIG. 2 is a schematic diagram of a model training method according to a second embodiment of the present application.

For the step S101 in FIG. 1, the present embodiment provides some specific implementations for the sample set. Further referring to FIG. 2, it shows a flow chart of another embodiment of the model training method provided by the embodiment of the present application. As shown in FIG. 2, the model training method may include the following steps.

At step S201, the sample set matching the template is acquired based on historical data of a target field.

Optionally, the method for acquiring the sample set through historical data includes: acquiring historical data of a target field; acquiring the sample set matching the template based on the historical data.

In the dialogue platform, a large amount of dialogue data has been accumulated, such as user logs, and the samples matching the template can be mined from the user logs and used as the sample set of the template.

At step S202, a sample set of an ordered template is generated.

For an ordered template; optionally, the acquiring the sample set corresponding to the template includes:
generating a sample candidate set corresponding to the template by using a beam search method and based on vocabulary values in the respective vocabularies of the plurality of keywords in the template fragment; performing template matching verification on the sample candidate set, and using a target sample set that passes the verification as the sample set corresponding to the template.

The process of generating a sample set for an ordered template will be illustrated below by exemplifying:

For an ordered template, the beam search method can be used to search for n matched samples (query). The specific process is:
randomly extracting n vocabulary values from the vocabulary of the first keyword, and then also extracting n vocabulary values from the vocabulary of the second keyword, so that there are n*n different combinations; and then based on the language model of bilstm (Bi-directional Long Short-Term Memory), calculating the Perplexity of n*n combinations (the smaller the value of Perplexity is, it indicates that the smoother the sentence is), and selecting n combinations therein with the least perplexity as a candidate set. And then extracting n vocabulary values from the vocabulary of the third keyword, forming n*n different combinations with the previously obtained candidate set, and repeating the previous process of calculating Perplexity, until n vocabulary values are also extracted from the vocabulary of the last keyword, n combinations with the least Perplexity are obtained as the final n matched queries, that is, the sample candidate set. For a large number of obtained queries, verification will be performed by using template matching, and the queries that cannot match the template will be removed, and those that pass the verification are the sample set of the obtained ordered template.

It can be understood that, due to the relatively small number of sample sets matched with the user logs, for model training, the amount of data in the sample set is far from sufficient. Therefore, a generative method needs to be used to generate a large number of samples for each ordered template. A large number of samples of the ordered templates can be quickly acquired by using the above mentioned generative method.

At step S203, a sample set of an unordered template is generated.

For an unordered template. Optionally, the acquiring the sample set corresponding to the template includes:

generating a candidate set corresponding to each of the template segments for each template segment in the plurality of template segments;

composing a plurality of target sequences by selecting candidate values from the respective candidate sets of the plurality of template fragments based on a preset organization format; wherein the preset organization format is determined through a first attribute of the unordered template, and the first attribute is template fragment order;

inputting the plurality of target sequences into a generative pre-training model to generate a sample candidate set corresponding to the unordered template;

performing template matching verification on the sample candidate set, and using a target sample set that passes the verification as the sample set corresponding to the template.

Optionally, before generating the candidate set corresponding to each template segment for each template segment in the plurality of template segments, the following is further included:

according to the second attribute of each template fragment of the unordered template, filtering out template fragments whose attributes are "not necessary" from the plurality of template fragments, and acquiring the remaining plurality of template fragments; wherein the second attribute is whether the template fragment is necessary.

That is to say, for each template segment in the remaining plurality of template segments, a candidate set of each template segment is acquired.

The process of generating samples for an unordered template will be illustrated below by exemplifying:

For an unordered template, the non-essential template fragments are randomly discarded, and for each of the remaining template fragments, n candidate values for each template fragment are obtained by using the search method adopted by the above-mentioned ordered template.

Then, for each template fragment, one of the candidate values is randomly extracted and organized into the following format: Fragment 1 [posX] Fragment 2 [posX] Fragment 3 [posX] Fragment 4 [posX] [cX], and outputted into a generative pre-training model (such as GPT-2, or Baidu's PLATO-2) to generate a query.

Wherein [posX] represents information on the template fragment order, [pos0] represents unordered, and [pos1] . . . [pos10] are sorted according to the relationship of the sizes. [cX] represents information on the threshold of coverage rate, [C0], [C1], [C2] . . . [C10] respectively represent the threshold of coverage rate [0-0.1), [0.1-0.2), [0.2-0.3) . . . [1.0, 1.0].

Finally, for the n candidate values of each template fragment obtained by the search method, a large number of queries are generated through random combination.

By taking the unordered template represented by the table in the step S101 as an example, one of the candidate values is randomly extracted and organized into the following format: check [pos0] I want [pos0] today [pos1] schedule [pos2] [c6], and the generated query is: Now I want to check today's schedule.

It should be noted that, finally, for all queries generated according to an ordered template or an unordered template, verification will be performed by using template matching, and the queries that cannot match the template will be removed, and then the samples mined from the logs before will be aggregated together, so that the sample candidate set of each template is obtained. The sample candidate set of each template can fully express semantics and sentence patterns of the template.

It can be understood that, due to the relatively small number of sample sets matched with the user logs, for model training, the amount of data in the sample set is far from sufficient. Therefore, a generative method needs to be used to generate a large number of samples for each unordered template. A large number of samples of the unordered templates can be quickly acquired by using the above mentioned generative method.

At step S204, the positive example pairs and the negative example pairs for the contrastive learning task are constructed based on the sample set.

Optionally, the constructing the positive example pairs and the negative example pairs for the contrastive learning task may include:

for the contrastive learning task between templates of different scenes, composing a plurality of samples of templates in the sample set, that belong to the same scene, into a plurality of positive example pairs, and composing a plurality of samples of templates, that do not belong to the same scene, into a plurality of negative example pairs;

for the contrastive learning task between templates of the same scene and of different intentions, composing a plurality of samples of templates in the sample set, that belong to the same scene and the same intention, into a plurality of positive example pairs, and composing a plurality of samples of templates, that belong to the same scene and different intentions, into a plurality of negative example pairs;

for the contrastive learning task between different templates of the same intention, composing a plurality of samples of the same template in the sample set, that belong to the same intention, into a plurality of positive example pairs, and composing a plurality of samples of different templates, that belong to the same intention, into a plurality of negative example pairs That is to say, in order to allow the model to better learn the knowledge in the dialogue understanding template, three contrastive learning tasks related to the template are constructed, so that the model can learn the differences of the semantics and the sentence patterns expressed in different templates, so that better semantic vectors are generated.

1. Comparison between templates of different scenes: positive example: two pieces of data generated by the templates in the same scene S; negative example group: a large number of pairs formed by data generated by the templates in the scene S and data the generated by the templates in other scenes.

2. Comparison between templates of different intentions and of the same scene: positive example: two pieces of data generated by the templates of an intention A; negative example group: a large number of pairs formed by data generated by the templates of the intention A and data generated by the templates of other intents.

3. Comparison between different templates of the same intention: positive example: two pieces of data generated by the template 1 of an intention A, which have high matching degree; negative example group: a large number of pairs formed by data generated by the template 1 of the intention A and data generated by the other templates of the intention A.

At step S205, contrastive learning training is performed on a pre-training model based on the positive example pairs and the negative example pairs for the contrastive learning task.

Optionally, the method for training the pre-training model includes: extracting a plurality of sample pairs from the positive example pairs and the negative example pairs for the contrastive learning task; inputting the plurality of sample pairs into the pre-training model to obtain the respective semantic representations of the plurality of samples; mapping the respective semantic representations of the plurality of samples to a contrastive learning loss space, and acquiring similarity between any two samples in the plurality of samples; acquiring the respective losses of the plurality of samples based on the similarity, and adjusting parameters of the pre-training model based on the losses.

That is, as a possible implementation, the pre-training model may be trained by the contrastive learning based on the SimCLR method.

As an example, when training the model, the number of a batch of inputted sample pairs is fixed, batch_size=256, for example, 256 positive example pairs are extracted. It should be noted that the positive example pairs are mutually positive examples, and each positive example and other positive example pairs in the positive example pairs are negative examples. For example, for the data in a batch, [z1,z1+], [z2,z2+], . . . [z256,z256'], for z1, z1+ is its positive example, and z2, z2+ . . . z256, z256+, 510 samples in total, are negative examples.

If a batch of samples are inputted into the pre-training model, their semantic representations will be obtained, and then mapping will be performed once through the linear layer, respectively, and then a cosine similarity S(zi, zj) will be calculated in pairs, and for each zi, 511 similarity values will be obtained, and then loss will be calculated by using the comparison loss function infoNCE loss (info Noise Contrastive Estimation loss). The formula of the comparison loss function is as follows:

$$L_i = -\log\left(e^{s(z_i, z_i^+)/\tau} / \sum_{j=0}^{K} e^{s(z_i, z_j)/\tau}\right)$$

Wherein $\tau$ is the temperature coefficient, which is used to adjust the similarity) distance, and in the present embodiment, is taken as 10; $(z_i, z_i^+)$ denotes positive example pairs, $(z_i, z_j)$ denotes negative example pairs, and K denotes the number of sample pairs.

In summary, it can be known that, for each zi in the batch, 512 infoNCE losses will be obtained, and the final loss (loss) will be obtained by averaging them. By using the adam algorithm, backpropagation updates parameters of the pre-training model. Finally, the samples of a plurality of batches are inputted into the pre-training model to complete the training of the pre-training model. Wherein the Adam optimization algorithm is a first-order optimization algorithm that can replace the traditional stochastic gradient descent process, and it can iteratively update the neural network weights based on the training data.

It should be noted that, for the contrastive learning training of the pre-training model, in addition to the SimCLR method mentioned in the embodiment of the present application, other methods with the same function can also be used, which will not be limited here.

In the model training method of the embodiment of the present application, firstly, acquisition of the sample set in a generative way will be realized by using historical data in combination with a language model and by using a generative model, which enriches the training samples, improves the model training effect, and improves the robustness of the pre-training model. And then the contrastive learning method will be applied to construct contrastive learning tasks among templates of different scenes, among templates of different intentions and of the same scene, and among different templates of the same intention, so that the pre-training model is caused to judge similarities and differences of the samples generated by the template, thereby introducing template knowledge into the pre-training model, and making the semantic representation produced by the pre-training model more suitable for dialogue understanding tasks.

Figure 3:
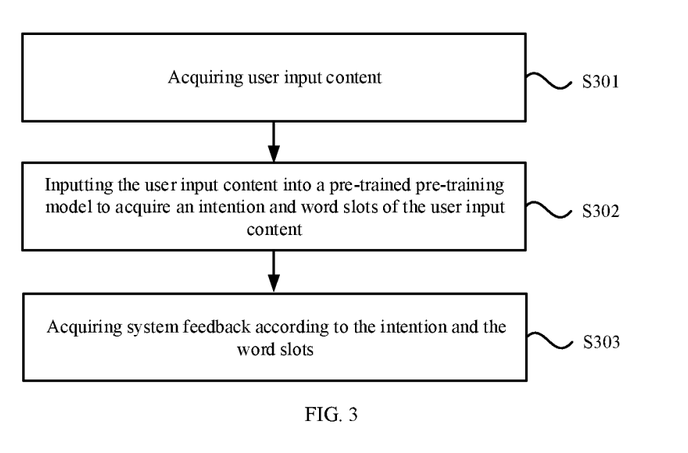
FIG. 3 is a schematic diagram of a method for human-machine interaction according to a third embodiment of the present application.

According to the above described model training method, the trained pre-training model will be obtained, and the trained pre-training model can be applied to the dialogue system. FIG. 3 is a flowchart of a method for human-machine interaction according to another embodiment of the present application. It should be noted that the execution subject of the method for human-machine interaction may be an electronic device such as a server. As shown in FIG. 3, the method for human-machine interaction may include the following steps.

At step S301 user input content is acquired.

The user input content inputted by the user may be acquired through a mobile terminal, a computer, and the like. For example, what will the weather be like tomorrow.

At step S302, the user input content is input into a pre-trained pre-training model to obtain intention and word slots of the user input content; wherein the pre-trained pre-training model is trained and obtained by using the model training method according to any one of the above described embodiments.

It can be understood that this pre-trained pre-training model will be applied to the dialogue understanding tasks.

The trained pre-training model will be obtained by inputting the acquired user input content (query) into the above described model training method embodiment, and intentions and word slots of the user input content will be predicted.

As a possible implementation, after the query is coded by the pre-trained pre-training model, the cls output hidden layer will be used to represent the predicted intentions, the representations will be influenced by using input on each token, and the word slots will be predicted by adding a crf layer.

In a certain user scenario, in order to establish task-based dialogue capabilities, some samples and templates will be annotated by a user. In the training phase, by using the model training method described in the above embodiment, a large number of samples with annotations will be generated according to user templates, merged with the samples annotated by the user, and putted into the pre-training model for training.

At step S303, system feedback is acquired according to the intentions and the word slots.

For a human-machine dialogue system, according to the intentions and the word slots of the user input content, the semantic information of the user will be acquired, and the answer matching the semantic information will be acquired from the corpus according to the semantic information, and the answer will be fed back to the client.

When predicting, in the trained pre-training model, a query will be inputted, and the model will return the results of the intentions and word slots of the query.

In the method for human-machine interaction of the embodiment of the present application, since the pre-training model with the template knowledge introduced is used to predict the intentions and the word slots, semantic representations that are more suitable for dialogue understanding tasks can be acquired, thereby obtaining feedback better matching user questions.

Figure 4:
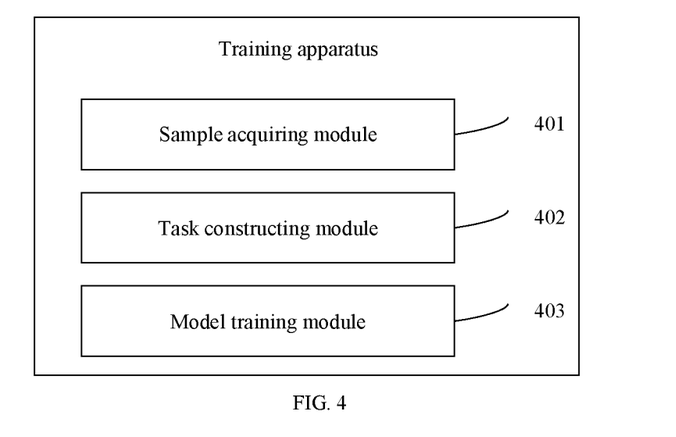
FIG. 4 is a schematic diagram of a model training apparatus according to a fourth embodiment of the present application.

As realization of the model training methods shown in the above respective figures, the present application provides an embodiment of a virtual apparatus implementing the model training methods. Further referring to FIG. 4, it shows a schematic structural diagram of a model training apparatus provided by an embodiment of the present application. As shown in FIG. 4, the model training apparatus may include a sample acquiring module 401, a task constructing module 402 and a model training module 403.

Specifically, the sample acquiring module 401 is configured to acquire a sample set corresponding to a template;
the task constructing module is configured to construct positive example pairs and negative example pairs for a contrastive learning task based on the sample set;
the model training module 403 is configured to perform contrastive learning training on a pre-training model based on the positive example pairs and the negative example pairs for the contrastive learning task.

In some embodiments of the present application, when the template is an ordered template including one template fragment, the template fragment includes a plurality of keywords; the sample acquiring module 401 is specifically configured to:
generate a sample candidate set corresponding to the template by using a beam search method and based on vocabulary values in the respective vocabularies of the plurality of keywords in the template fragment;
perform template matching verification on the sample candidate set, and use a target sample set that passes the verification as the sample set corresponding to the template.

In some embodiments of the present application, when the template is an unordered template including a plurality of template fragments, the template fragment includes one or more keywords; the sample acquiring module 401 is specifically configured to:
generate a candidate set corresponding to each of the template segments for each template segment in the plurality of template segments;
compose a plurality of target sequences by selecting candidate values from the respective candidate sets of the plurality of template fragments based on a preset organization format; wherein the preset organization format is determined through a first attribute of the unordered template, and the first attribute is template fragment order;
input the plurality of target sequences into a generative pre-training model to generate a sample candidate set corresponding to the unordered template;
perform template matching verification on the sample candidate set, and use a target sample set that passes the verification as the sample set corresponding to the template.

In some embodiments of the present application, the sample acquiring module 401 is further configured to:
acquire historical data of a target field;
acquire the sample set matching the template based on the historical data.

In some embodiments of the present application, the task constructing module 402 is specifically configured to:
for the contrastive learning task between templates of different scenes, compose a plurality of samples of templates in the sample set, that belong to the same scene, into a plurality of positive example pairs, and compose a plurality of samples of templates, that do not belong to the same scene, into a plurality of negative example pairs;
for the contrastive learning task between templates of the same scene and of different intentions, compose a plurality of samples of templates in the sample set, that belong to the same scene and the same intention, into a plurality of positive example pairs, and compose a plurality of samples of templates, that belong to the same scene and different intentions, into a plurality of negative example pairs;
for the contrastive learning task between different templates of the same intention, compose a plurality of samples of the same template in the sample set, that belong to the same intention, into a plurality of positive example pairs, and compose a plurality of samples of different templates, that belong to the same intention, into a plurality of negative example pairs In some embodiments of the present application, the model training module 403 is specifically configured to:
extract a plurality of sample pairs from the positive example pairs and the negative example pairs for the contrastive learning task;
input the plurality of sample pairs into the pre-training model to obtain the respective semantic representations of the plurality of samples;
map the respective semantic representations of the plurality of samples to a contrastive learning loss space, and acquire similarity between any two samples in the plurality of samples;
acquire the respective losses of the plurality of samples based on the similarity, and adjust parameters of the pre-training model based on the losses.

With regard to the apparatus in the above embodiment, the specific manners in which the respective modules execute operations have been described in detail in the embodiment regarding the method, and will not be described in detail here.

In the model training apparatus of the embodiment of the present application, firstly, acquisition of the sample set in a generative way will be realized by using historical data in combination with a language model and by using a generative model, which enriches the training samples, improves the model training effect, and improves the robustness of the pre-training model. And then the contrastive learning method will be applied to construct contrastive learning tasks among templates of different scenes, among templates of different intentions and of the same scene, and among different templates of the same intention, so that the pre-training model is caused to judge similarities and differences of the samples generated by the template, thereby introducing template knowledge into the pre-training model, and making the semantic representation produced by the pre-training model more suitable for dialogue understanding tasks.

Figure 5:
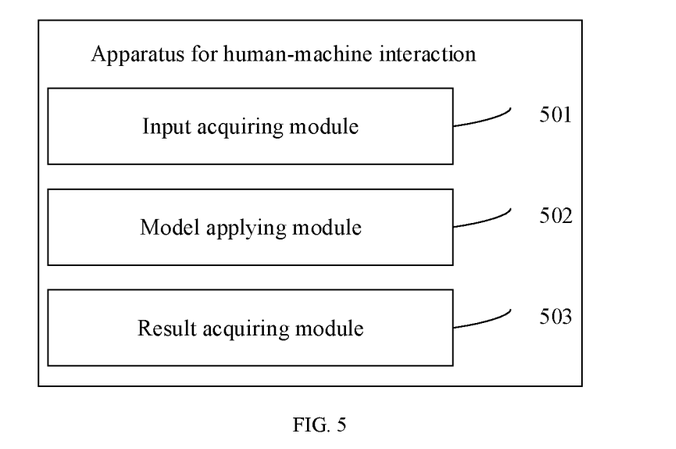
FIG. 5 is a schematic diagram of an apparatus for human-machine interaction according to a fifth embodiment of the present application.

As an implementation of the above method for human-machine interaction shown in FIG. 3, the present application provides an embodiment of a virtual apparatus for the method for human-machine interaction. Further referring to FIG. 5, it shows a schematic structural diagram of the apparatus for human-machine interaction provided by an embodiment of the present application. As shown in FIG. 5, the apparatus for human-machine interaction may include an input acquiring module 501, a model application module 502 and a result acquiring module 503.

The input acquiring module 501 is configured to acquire user input content;

the model application module 502 is configured to input the user input content into a pre-trained pre-training model to obtain intention and word slots of the user input content; wherein the pre-trained pre-training model is trained and obtained by using the model training method according to any one of the above embodiments;

the result acquiring module 503 is configured to acquire system feedback according to the intention and the word slots.

In the apparatus for human-machine interaction of the embodiment of the present application, since the pre-training model with the template knowledge introduced is used to predict the intentions and the word slots, semantic representations that are more suitable for dialogue understanding tasks can be acquired, thereby obtaining feedback better matching user questions.

According to the embodiments of the present application, the present application also provides an electronic device and a readable storage medium.

Figure 6:
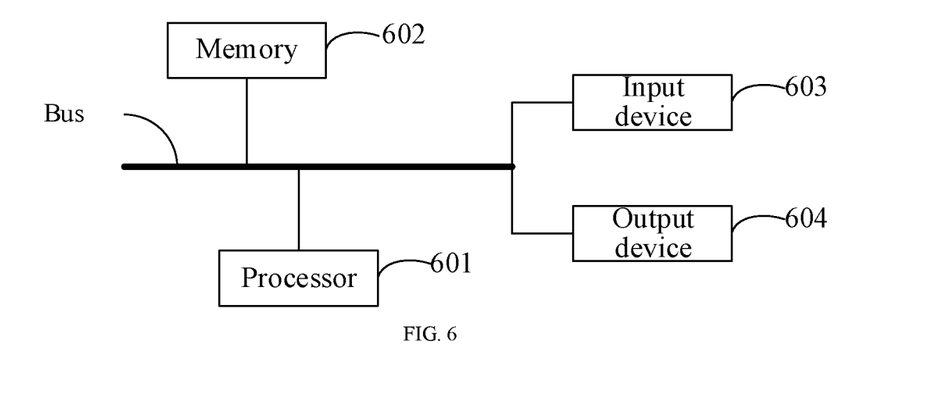
FIG. 6 is a block diagram of an electronic device used to implement the model training method of the embodiments of the present application.

As shown in FIG. 6, it is a block diagram of an electronic device for implementing a model training method according to an embodiment of the present application. An electronic device is intended to represent various forms of digital computers, such as laptops, desktops, workstations, personal digital assistants, servers, blade servers, mainframes, and other suitable computers. An electronic device may also represent various forms of mobile apparatuses, such as personal digital processing, cellular telephones, smart phones, wearable devices, and other similar computing apparatuses. The components shown herein, their connections and relationships, and their functions, are by way of example only, and are not intended to limit implementations of the present application described and/or claimed herein.

As shown in FIG. 6, the electronic device includes: one or more processors 601, a memory 602, and interfaces for connecting various components, including high-speed interfaces and low-speed interfaces. The various components are interconnected using different buses and may be mounted on a common motherboard or mounted in other ways as desired. The processor may process instructions executed within the electronic device, including instructions stored in or on the memory to display graphical information of the GUI on an external input/output device such as a display device coupled to an interface. In other implementations, if desired, a plurality of processors and/or a plurality of buses may be used with a plurality of memories and a plurality of storages. Likewise, a plurality of electronic devices may be connected, and each device provides a part of the necessary operations (for example, as a server array, a set of blade servers, or a multi-processor system). In FIG. 6, one processor 601 is taken as an example.

The memory 602 is the non-transitory computer-readable storage medium provided in the present application. Wherein instructions executable by at least one processor are stored in the memory, so that the at least one processor executes the model training method provided by the present application. The non-transitory computer-readable storage medium of the present application stores computer instructions, and the computer instructions are used to cause a computer to execute the model training method provided by the present application.

The memory 602, as a non-transitory computer-readable storage medium, can be used to store non-transitory software programs, non-transitory computer-executable programs and modules, such as program instructions/modules corresponding to the model training methods in the embodiment of the present application (for example, the sample acquiring module 401, the task constructing module 402 and the model training module 403 shown in FIG. 4). The processor 601 executes various functional applications and data processing of the server by running the non-transitory software programs, instructions and modules stored in the memory 602, that is, implements the model training method in the above method embodiments.

The memory 602 may include a program storage area and a data storage area, wherein the program storage area may store an operating system and applications required by at least one function; the data storage area may store data created according to use of the electronic device for model training, and the like. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include a memory that is remotely located relative to the processor 601, and these remote memories may be connected to the electronic device for model training through a network. Examples of the aforementioned networks include, but are not limited to, Internet, intranets, local area networks, mobile communication networks, and combinations thereof.

The electronic device for the model training method may further include: an input device 603 and an output device 604. The processor 601, the memory 602, the input device 603, and the output device 604 may be connected via a bus or in other ways, and connection via a bus is taken as an example in FIG. 6.

The input device 603 can receive inputted information on numbers or characters, and generate key signal input related to user settings and function control of the electronic device for model training, such as input devices such as touch screen, small keyboard, mouse, trackpad, touchpad, pointing stick, one or more mouse buttons, trackballs, joysticks, and the like. The output device 604 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some implementations, the display device may be a touch screen.

Various embodiments of the systems and techniques described here can be implemented in digital electronic circuit systems, integrated circuit systems, dedicated ASICs (application specific integrated circuits), computer hardware, firmware, software, and/or combinations thereof. These various embodiments may include: being implemented in one or more computer programs, which can be executed and/or interpreted on a programmable system including at least one programmable processor, and the programmable processor may be a special-purpose or a general-purpose programmable processor, can receive data and instructions from a storage system, at least one input device, and at least one output device, and transmit data and instructions to this storage system, this at least one input device, and this at least one output device.

These computing programs (also referred to as programs, software, software applications, or codes) include machine instructions for a programmable processor and may utilize high-level procedural and/or object-oriented programming languages and/or assembly/machine language to implement these computing programs. As used herein, the terms "machine-readable medium" and "computer-readable medium" refer to any computer program product, device, and/or apparatus for providing machine instructions and/or data to a programmable processor (such as magnetic disks, optical disks, memories, programmable logic devices (PLDs)), including machine-readable media that receive machine instructions as machine-readable signals. The term "machine-readable signal" refers to any signal used to provide machine instructions and/or data to a programmable processor.

To provide for interaction with a user, the systems and techniques described here can be implemented on a computer, which has: a display device (for example, a CRT (cathode ray tube) or LCD (liquid crystal display) monitor) for displaying information to the user; and a keyboard and pointing device (for example, a mouse or a trackball), through which the user can provide input to the computer. Other kinds of devices may also be used to provide interaction with the user; for example, feedback provided to the user may be any form of sensory feedback (for example, visual feedback, auditory feedback, or tactile feedback); and input from the user may be received in any form (including acoustic input, voice input, or tactile input).

The systems and techniques described here may be implemented in a computing system (for example, as a data server) that includes back-end components, or a computing system (for example, an application server) that includes middleware components, or a computing system (for example, a user computer having a graphical user interface or a web browser, through which a user can interact with embodiments of the systems and techniques described here) that includes front-end components, or a computing system that includes any combination of such back-end components, middleware components, or front-end components. The components of the system can be interconnected by any form or medium of digital data communication (for example, a communication network). Examples of the communication network include: local area networks (LANs), wide area networks (WANs), the Internet, and blockchain networks.

The computer system may include clients and servers. Clients and servers are generally remote from each other and typically interact through a communication network. The relationship of client and server will be generated by computer programs running on the respective computers and having a client-server relationship to each other.

It should be understood that steps may be reordered, added or deleted using the various forms of flow shown above. For example, the respective steps disclosed in the present application may be executed in parallel, may also be executed sequentially, or may also be executed in a different order, as long as the desired result of the technical solutions disclosed in the present application can be achieved, and no limitation is imposed thereto herein.

The specific embodiments described above do not constitute a limitation on the protection scope of the present application. It should be apparent to those skilled in the art that various modifications, combinations, sub-combinations and substitutions may be made depending on design requirements and other factors. Any modifications, equivalent replacements and improvements made within the spirit and the principle of the present application shall be included within the protection scope of the present application.

What is claimed is:

1. A model training method, comprising:
   acquiring a sample set corresponding to a template, wherein the sample set contains template semantics;
   constructing positive example pairs and negative example pairs for a contrastive learning task based on the sample set; and
   performing contrastive learning training on a pre-training model based on the positive example pairs and the negative example pairs for the contrastive learning task;
   semantic representation produced by the pre-training model being used for a dialogue understanding task;
   wherein performing contrastive learning training on the pre-training model based on the positive example pairs and the negative example pairs for the contrastive learning task comprises:
   extracting a plurality of sample pairs from the positive example pairs and the negative example pairs for the contrastive learning task;
   inputting the plurality of sample pairs into the pre-training model to obtain respective semantic representations of the plurality of samples;
   mapping the respective semantic representations of the plurality of samples to a contrastive learning loss space;
   acquiring a similarity between any two samples in the plurality of samples;
   acquiring respective losses of the plurality of samples based on the similarity; and
   adjusting parameters of the pre-training model based on the losses.

2. The method according to claim 1, wherein the template is an ordered template comprising one template fragment, and the template fragment comprises a plurality of keywords;
   wherein, acquiring the sample set corresponding to the template comprises:
   generating a sample candidate set corresponding to the template by using a beam search method and based on vocabulary values in respective vocabularies of the plurality of keywords in the template fragment; and
   performing template matching verification on the sample candidate set, and using a target sample set that passes the template matching verification as the sample set corresponding to the template.

3. The method according to claim 1, wherein the template is an unordered template comprising a plurality of template fragments, and the template fragment comprises one or more keywords;
   wherein, acquiring the sample set corresponding to the template comprises:
   for each template segment in the plurality of template segments, generating a candidate set corresponding to the template segment;
   composing a plurality of target sequences by selecting candidate values from the respective candidate sets of the plurality of template fragments based on a preset organization format; wherein
   the preset organization format is determined through a first attribute of the unordered template, and the first attribute is a template fragment order;
   inputting the plurality of target sequences into a generative pre-training model to generate a sample candidate set corresponding to the unordered template;

performing template matching verification on the sample candidate set, and using a target sample set that passes the template matching verification as the sample set corresponding to the template.

4. The method according to claim 1, wherein acquiring the sample set corresponding to the template comprises:
acquiring historical data of a target field;
acquiring the sample set matching the template based on the historical data.

5. The method according to claim 1, wherein constructing the positive example pairs and the negative example pairs for the contrastive learning task based on the sample set comprises:
for the contrastive learning task between templates of different scenes, composing a plurality of samples of templates belonging to a same scene in the sample set into a plurality of positive example pairs, and composing a plurality of samples of templates not belonging to a same scene in the sample set into a plurality of negative example pairs;
for the contrastive learning task between templates of a same scene and of different intentions, composing a plurality of samples of templates belonging to a same scene and having a same intention in the sample set into a plurality of positive example pairs, and composing a plurality of samples of templates belonging to a same scene and having different intentions into a plurality of negative example pairs;
for the contrastive learning task between different templates of a same intention, composing a plurality of samples of a same template having a same intention in the sample set into a plurality of positive example pairs, and composing a plurality of samples of different templates having a same intention into a plurality of negative example pairs.

6. A method for human-machine interaction, comprising:
acquiring user input content;
inputting the user input content into a pre-trained pre-training model to obtain an intention and word slots of the user input content; wherein the pre-trained pre-training model is obtained by using the model training method according to claim 1; and
acquiring system feedback according to the intention and the word slots.

7. An electronic device, characterized by comprising:
at least one processor; and
a memory communicatively connected to the at least one processor;
wherein, instructions executable by the at least one processor are stored in the memory, and the instructions are executed by the at least one processor, so that the at least one processor can execute the followings:
acquiring a sample set corresponding to a template, wherein the sample set contains template semantics;
constructing positive example pairs and negative example pairs for a contrastive learning task based on the sample set; and
performing contrastive learning training on a pre-training model based on the positive example pairs and the negative example pairs for the contrastive learning task;
semantic representation produced by the pre-training model being used for a dialogue understanding task;
wherein performing contrastive learning training on the pre-training model based on the positive example pairs and the negative example pairs for the contrastive learning task comprises:

extracting a plurality of sample pairs from the positive example pairs and the negative example pairs for the contrastive learning task;
inputting the plurality of sample pairs into the pre-training model to obtain respective semantic representations of the plurality of samples;
mapping the respective semantic representations of the plurality of samples to a contrastive learning loss space;
acquiring a similarity between any two samples in the plurality of samples;
acquiring respective losses of the plurality of samples based on the similarity; and
adjusting parameters of the pre-training model based on the losses.

8. The device according to claim 7, wherein the template is an ordered template comprising one template fragment, and the template fragment comprises a plurality of keywords;
wherein, acquiring the sample set corresponding to the template comprises:
generating a sample candidate set corresponding to the template by using a beam search method and based on vocabulary values in respective vocabularies of the plurality of keywords in the template fragment; and
performing template matching verification on the sample candidate set, and using a target sample set that passes the template matching verification as the sample set corresponding to the template.

9. The device according to claim 7, wherein the template is an unordered template comprising a plurality of template fragments, and the template fragment comprises one or more keywords;
wherein, acquiring the sample set corresponding to the template comprises:
for each template segment in the plurality of template segments, generating a candidate set corresponding to the template segment;
composing a plurality of target sequences by selecting candidate values from the respective candidate sets of the plurality of template fragments based on a preset organization format; wherein
the preset organization format is determined through a first attribute of the unordered template, and the first attribute is a template fragment order;
inputting the plurality of target sequences into a generative pre-training model to generate a sample candidate set corresponding to the unordered template;
performing template matching verification on the sample candidate set, and using a target sample set that passes the template matching verification as the sample set corresponding to the template.

10. The device according to claim 7, wherein acquiring the sample set corresponding to the template comprises:
acquiring historical data of a target field;
acquiring the sample set matching the template based on the historical data.

11. The device according to claim 7, wherein constructing the positive example pairs and the negative example pairs for the contrastive learning task based on the sample set comprises:
for the contrastive learning task between templates of different scenes, composing a plurality of samples of templates belonging to a same scene in the sample set into a plurality of positive example pairs, and composing a plurality of samples of templates not belonging to a same scene in the sample set into a plurality of negative example pairs;

for the contrastive learning task between templates of a same scene and of different intentions, composing a plurality of samples of templates belonging to a same scene and having a same intention in the sample set into a plurality of positive example pairs, and composing a plurality of samples of templates belonging to a same scene and having different intentions into a plurality of negative example pairs;

for the contrastive learning task between different templates of a same intention, composing a plurality of samples of a same template having a same intention in the sample set into a plurality of positive example pairs, and composing a plurality of samples of different templates having a same intention into a plurality of negative example pairs.

12. A non-transitory computer-readable storage medium storing computer instructions, wherein the computer instructions are configured to cause a computer to execute the followings:

acquiring a sample set corresponding to a template, wherein the sample set contains template semantics;

constructing positive example pairs and negative example pairs for a contrastive learning task based on the sample set; and performing contrastive learning training on a pre-training model based on the positive example pairs and the negative example pairs for the contrastive learning task;

semantic representation produced by the pre-training model being used for a dialogue understanding task;

wherein performing contrastive learning training on the pre-training model based on the positive example pairs and the negative example pairs for the contrastive learning task comprises:

extracting a plurality of sample pairs from the positive example pairs and the negative example pairs for the contrastive learning task;

inputting the plurality of sample pairs into the pre-training model to obtain respective semantic representations of the plurality of samples;

mapping the respective semantic representations of the plurality of samples to a contrastive learning loss space;

acquiring a similarity between any two samples in the plurality of samples;

acquiring respective losses of the plurality of samples based on the similarity; and adjusting parameters of the pre-training model based on the losses.

13. The storage medium according to claim 12, wherein the template is an ordered template comprising one template fragment, and the template fragment comprises a plurality of keywords;

wherein, acquiring the sample set corresponding to the template comprises:

generating a sample candidate set corresponding to the template by using a beam search method and based on vocabulary values in respective vocabularies of the plurality of keywords in the template fragment; and performing template matching verification on the sample candidate set, and using a target sample set that passes the template matching verification as the sample set corresponding to the template.

14. The storage medium according to claim 12, wherein the template is an unordered template comprising a plurality of template fragments, and the template fragment comprises one or more keywords;

wherein, acquiring the sample set corresponding to the template comprises:

for each template segment in the plurality of template segments, generating a candidate set corresponding to the template segment;

composing a plurality of target sequences by selecting candidate values from the respective candidate sets of the plurality of template fragments based on a preset organization format; wherein the preset organization format is determined through a first attribute of the unordered template, and the first attribute is a template fragment order;

inputting the plurality of target sequences into a generative pre-training model to generate a sample candidate set corresponding to the unordered template;

performing template matching verification on the sample candidate set, and using a target sample set that passes the template matching verification as the sample set corresponding to the template.

15. The storage medium according to claim 12, wherein acquiring the sample set corresponding to the template comprises:

acquiring historical data of a target field;

acquiring the sample set matching the template based on the historical data.

16. The storage medium according to claim 12, wherein constructing the positive example pairs and the negative example pairs for the contrastive learning task based on the sample set comprises:

for the contrastive learning task between templates of different scenes, composing a plurality of samples of templates belonging to a same scene in the sample set into a plurality of positive example pairs, and composing a plurality of samples of templates not belonging to a same scene in the sample set into a plurality of negative example pairs;

for the contrastive learning task between templates of a same scene and of different intentions, composing a plurality of samples of templates belonging to a same scene and having a same intention in the sample set into a plurality of positive example pairs, and composing a plurality of samples of templates belonging to a same scene and having different intentions into a plurality of negative example pairs;

for the contrastive learning task between different templates of a same intention, composing a plurality of samples of a same template having a same intention in the sample set into a plurality of positive example pairs, and composing a plurality of samples of different templates having a same intention into a plurality of negative example pairs.

* * * * *